US006483667B1

(12) United States Patent
Berg et al.

(10) Patent No.: US 6,483,667 B1
(45) Date of Patent: Nov. 19, 2002

(54) SELF-LOADING DISC HEAD SLIDER HAVING MULTIPLE STEPS APPROXIMATING A LEADING TAPER

(75) Inventors: Lowell J. Berg, Minnetonka; James R. Krolnik, Burnsville; Scott E. Ryun, Prior Lake; James J. Stolte, Minneapolis; Yu-Li Chang, Prior Lake; Lanshi Zheng; Ling L. Wang, both of Eden Prairie, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/354,419

(22) Filed: Jul. 15, 1999

Related U.S. Application Data
(60) Provisional application No. 60/093,739, filed on Jul. 21, 1998.

(51) Int. Cl.[7] ................................................ G11B 5/60
(52) U.S. Cl. ................................................ 360/235.6
(58) Field of Search ......................... 360/235.6, 235.7, 360/235.8, 235.9, 236

(56) References Cited

U.S. PATENT DOCUMENTS

| 3,488,648 A | 1/1970 | Church | 340/174.1 |
|---|---|---|---|
| 4,670,806 A | 6/1987 | Ghose | 360/103 |
| 4,673,996 A | 6/1987 | White | 360/103 |
| 4,893,204 A | 1/1990 | Yamada et al. | 360/103 |
| 4,939,603 A | 7/1990 | Inumochi | 360/103 |
| 5,062,017 A | 10/1991 | Strom et al. | 360/103 |
| 5,128,822 A | 7/1992 | Chapin et al. | 360/103 |
| 5,267,108 A | 11/1993 | Tani | 360/103 |
| 5,404,256 A | 4/1995 | White | 360/103 |
| 5,508,862 A | 4/1996 | Lazzari et al. | 360/103 |
| 5,515,219 A | 5/1996 | Ihrke et al. | 360/103 |

FOREIGN PATENT DOCUMENTS

| EP | 0 129 336 | 12/1984 |
|---|---|---|
| JP | 1-211383 | 8/1989 |
| JP | 0105778 | 5/1991 |

OTHER PUBLICATIONS

W.G. Jacobs, IBM Technical Disclosure Bulletin, "Air Bearing Magnetic Head," vol. 24, No. 11B, Apr. 1982, p. 6202.

Primary Examiner—George J. Letscher
(74) Attorney, Agent, or Firm—Westman, Champlin & Kelly

(57) ABSTRACT

A self-loading disc head-slider has a slider body, with a leading slider edge and a trailing slider edge, and first and second raised rails. Each raised rail has a leading rail edge, inside and outside rail edges and a bearing surface. A cavity dam extends between the first and second raised rails. A subambient pressure cavity trails the cavity dam, between the first and second raised rails. A stepped leading taper extends from the leading slider edge to the bearing surfaces of the first and second raised rails. The stepped leading taper is formed of first and second steps. The first step is positioned along the leading slider edge. The second step wraps around the leading rail edges of the first and second raised rails and extends along a portion of the inside and outside rail edges of the first and second raised rails. The first and second steps have a step height of 0.05 to 1.5 microns.

19 Claims, 7 Drawing Sheets

SELF-LOADING DISC HEAD SLIDER HAVING MULTIPLE STEPS APPROXIMATING A LEADING TAPER

CROSS-REFERENCE TO RELATED APPLICATION

This application claims the benefit of U.S. Provisional Patent Application No. 60/093,739, entitled "METHOD FOR IMPROVING AIR BEARING PRESSURIZATION" and filed on Jul. 21, 1998.

BACKGROUND OF THE INVENTION

The present invention relates to disc drive data storage systems and, more particularly, to a disc drive data storage system having a slider with steps approximating a leading taper.

Disc drives of the "Winchester" type are well known in the industry. Such drives use rigid discs which are coated with a magnetizable medium for storage of digital information in a plurality of circular, concentric data tracks. The discs are mounted on a spindle motor which causes the discs to spin and the surfaces of the discs to pass under respective hydrodynamic (e.g. air) bearing disc head sliders. The sliders carry transducers which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes an air bearing surface which faces the disc surface. As the disc rotates, the disc drags air under the slider and along the air bearing surface in a direction approximately parallel to the tangential velocity of the disc. As the air passes beneath the air bearing surface, air compression along the air flow path causes the air pressure between the disc and the air bearing surface to increase which creates a hydrodynamic lifting force that counteracts the load force and causes the slider to lift and fly above or in close proximity to the disc surface.

One type of slider is a "self-loading" air bearing slider, which includes a leading taper, a pair of raised side rails, a cross rail and a subambient pressure cavity. The leading taper is lapped onto the end of the slider that is opposite to the recording head. The leading taper pressurizes the air as the air is dragged under the slider by the disc surface. An additional effect of the leading taper is that the pressure distribution under the slider has a peak near the taper end or "leading edge" due to a high compression angle of the taper, and a second peak near the recording end or "trailing edge" due to a low bearing clearance required for efficient magnetic recording. This dual-peak pressure distribution results in an air bearing with a high pitch stiffness.

The bearing clearance between the slider and the disc surface at the recording head is an important parameter to disc drive performance. It is desired to minimize variation in the head clearance or "flying height". Therefore, it is important to control several metrics of flying height performance, such as flying height sensitivity to process variations, ambient pressure (e.g., altitude) variations, changes in radial position of the slider over the disc surface and resulting head skew, and quick movements of the slider from one radial position to another radial position. Also, the slider should take off from the disc surface as quickly as possible after the start of disc rotation.

The above-mentioned sensitivities are reduced by providing the slider with a high bearing stiffness in the pitch and roll directions and vertically in a direction normal to the disc surface. High vertical bearing stiffness has been achieved with the use of sub-ambient pressure cavities. The cross rail provides an expansion path for the air to de-pressurize as it is dragged into the sub-ambient pressure cavity by the disc velocity. The expanded air in the cavity provides a self-loading force which forces the slider toward the disc surface. The counteraction between positive pressure developed along the side rails, the preload force provided by the suspension and the self-loading force provides the air bearing with a high vertical stiffness and a relative insensitivity to variations in ambient pressure. To achieve high pitch and roll stiffness, air bearings have utilized geometries that distribute the positive pressure away from the center of the slider.

Quick take-off is typically achieved by developing high pressure near the leading edge of the slider through the leading taper. The leading taper causes the pressure to rise rapidly from ambient pressure at the slider's perimeter towards the interior of the slider. This rapid pressurization is also useful in improving pitch and normal stiffness and in decreasing changes in fly height with changes in ambient pressure.

Since the air bearing surface is pressurized by the leading taper, variation in the taper angle and the position of the taper relative to other air bearing surface features causes the flying height of the transducer to vary. In addition, the flying height of the transducer typically varies proportionately more with variations in the manufacture of the taper than with other manufacturing variations.

There are three major difficulties associated with the conventional method of forming the leading taper. First, the angle of the taper with respect to the air bearing surface can be controlled only to the degree afforded by the mechanical tilting mechanism used during the grinding or lapping process. Second, the length of the taper and its position with respect to other air bearing surface features varies with the uncertainty in the grinding or lapping rate and with the tilt angle. The intersection between the leading taper and the air bearing surface has the greatest variability in location relative to other air bearing surface features, at shallow taper angles. Third, conventional grinding or lapping processes permit only linear leading tapers. Also, the intersection between the taper and the air bearing surface is limited to a line which is parallel to the trailing edge of the slider.

Alternatively, sliders have been fabricated with a step at the leading edges of the side rails. This leading edge step constrains air flow approaching the side rails and causes the pressure to increase substantially when the flow reaches the rails. Leading edge steps are typically fabricated by ion milling the bearing surface. With ion milling, the position and depth of the step can be controlled very accurately. However, a leading edge step does not pressurize the leading edge of the slider as effectively as a leading taper.

Improved slider geometries are desired which effectively pressurize the leading edge of the slider and yet have small flying height sensitivities to process variations and ambient pressure.

SUMMARY OF THE INVENTION

One aspect of the present invention relates to a self-loading disc head slider having a slider body, with a leading slider edge and a trailing slider edge, and first and second raised rails. Each raised rail has a leading rail edge, inside and outside rail edges and a bearing surface. A cavity dam extends between the first and second raised rails. A subambient pressure cavity trails the cavity dam, between the first and second raised rails. A stepped leading taper extends from the leading slider edge to the bearing surfaces of the first and second raised rails. The stepped leading taper is formed of first and second steps. The first step is positioned along the leading slider edge. The second step wraps around the leading rail edges of the first and second raised rails and extends along a portion of the inside and outside rail edges of the first and second raised rails. The first and second steps have a step height of 0.05 to 1.5 microns.

Another aspect of the present invention relates to a disc drive assembly, which includes a housing, a data storage disc, an actuator assembly attached to the housing, a suspension supported by the actuator assembly, and a slider supported by the actuator assembly. The slider has a bearing surface and means for approximating a taper at a leading edge of the bearing surface.

DETAILED DESCRIPTION OF THE PREFERRED EMBODIMENTS

Figure 1:
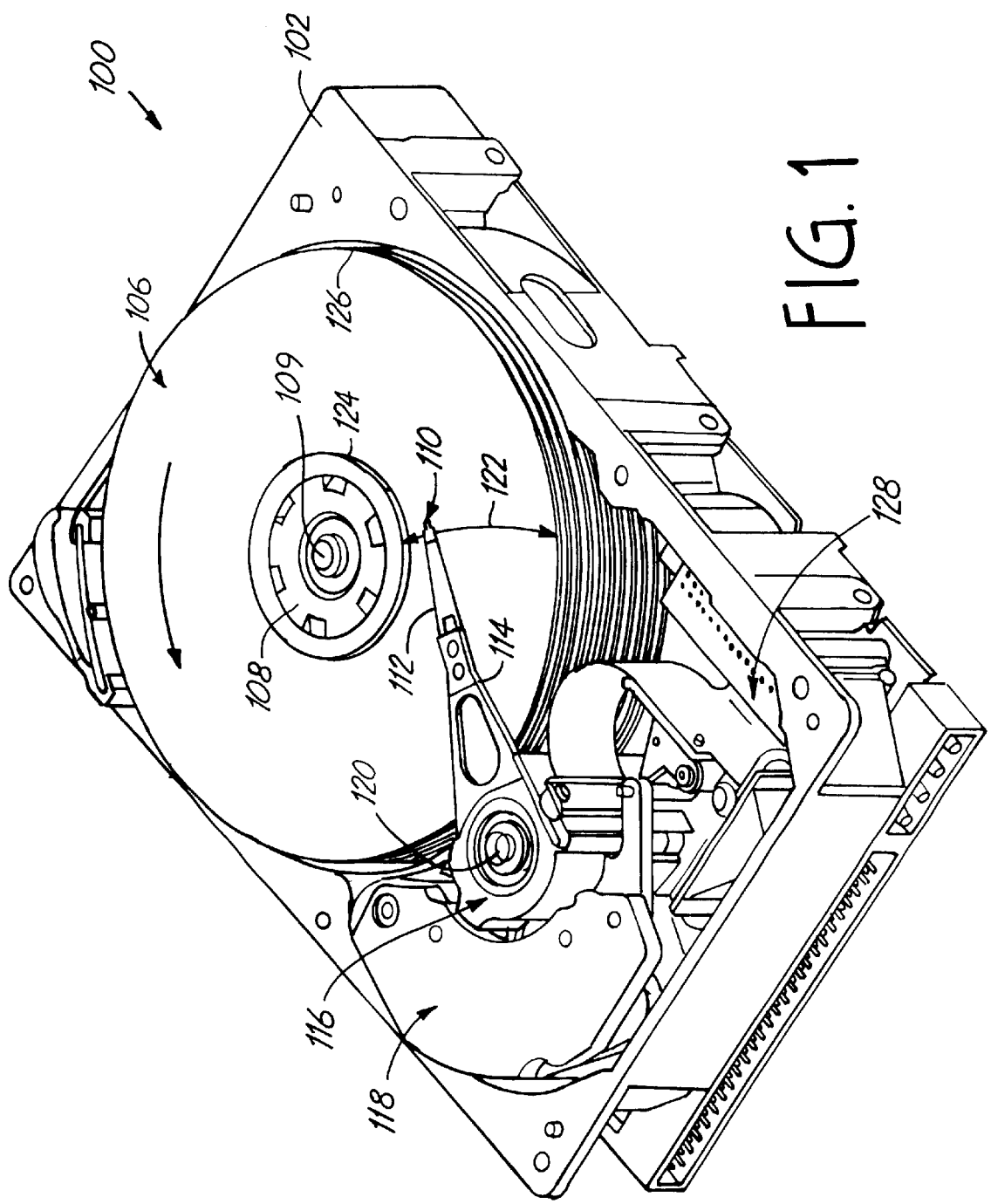
FIG. 1 is a perspective view of a disc drive in which the slider of the present invention can be used.

FIG. 1 is a perspective view of a disc drive 100 in which the present invention is useful. The same reference numerals are used in the various figures to represent the same or similar elements. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs which are mounted for co-rotation about central axis 109. Each disc surface has an associated slider 110 which is mounted to disc drive 100 and carries a read/write head for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor operates under control of internal circuitry 128. Other types of actuators can also be used, such as linear actuators.

Figure 2:
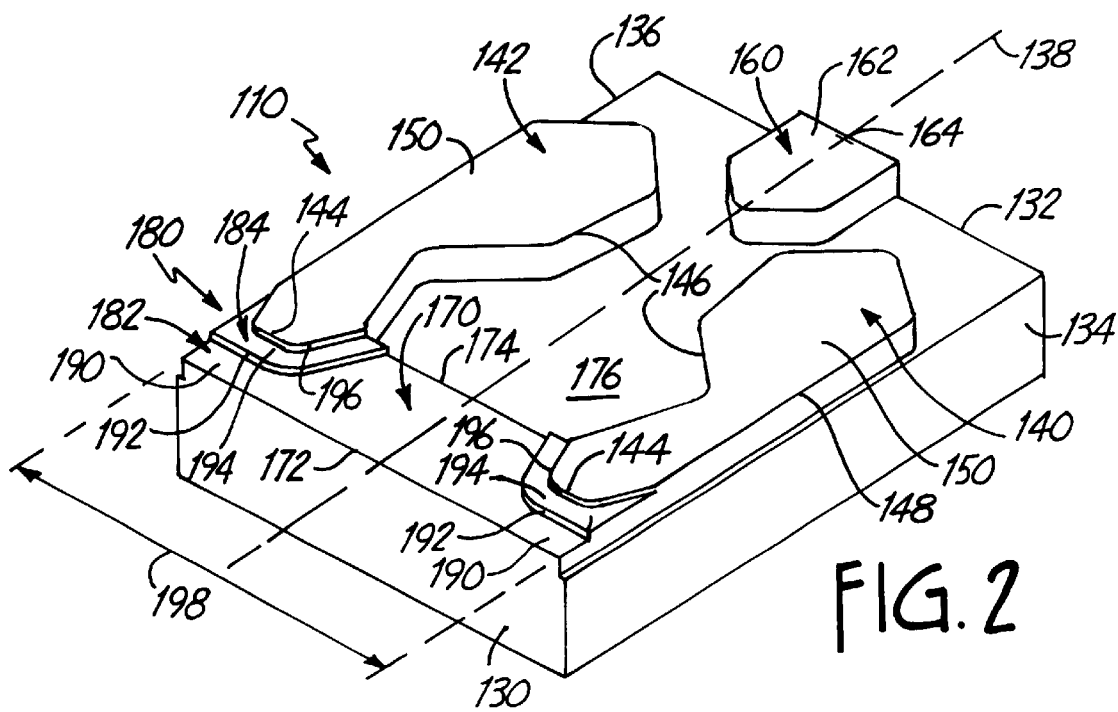
FIG. 2 is a bottom, perspective view of a slider in the disc drive shown in FIG. 1 according to one embodiment of the present invention.

FIG. 2 is a bottom, perspective view of slider 110 according to one embodiment of the present invention. Slider 110 has a leading slider edge 130, a trailing slider edge 132, slider side edges 134 and 136 and a longitudinal center line 138. Raised side rails 140 and 142 are positioned along side edges 134 and 136, respectively. Rails 140 and 142 extend generally from leading slider edge 130 toward trailing slider edge 132, and terminate prior to the trailing slider edge. Each rail 140 and 142 has a leading rail edge 144, an inside rail edge 146, an outside rail edge 148 and a bearing surface 150.

A raised center pad 160 is positioned along trailing slider edge 132 and is centered along longitudinal center line 138. Center pad 160 has a bearing surface 162 and supports a read/write transducer 164.

A cavity dam 170 extends between rails 140 and 142, along leading slider edge 130. Cavity dam 170 has a leading edge 172 and a trailing edge 174. Cavity dam 170 and rails 140 and 142 define a subambient pressure cavity 176, which trails cavity dam 170 relative to a direction of airflow from leading slider edge 130 toward trailing slider edge 132.

Slider 110 further includes a series of steps 182 and 184, which are positioned between leading slider edge 130 and the bearing surfaces 150 of rails 140 and 142. Steps 182 and 184 together form a stepped leading "taper" 180 along leading slider edge 130, which approximates a traditional leading taper that would otherwise be formed by a grinding or lapping process. In contrast, steps 182 and 184 are formed through photolithography processes, such as ion milling, chemical etching, or Reactive Ion Etching (RIE). With these processes, the depths and locations of the steps can be more accurately controlled than with a grinding or lapping process.

Figure 3:
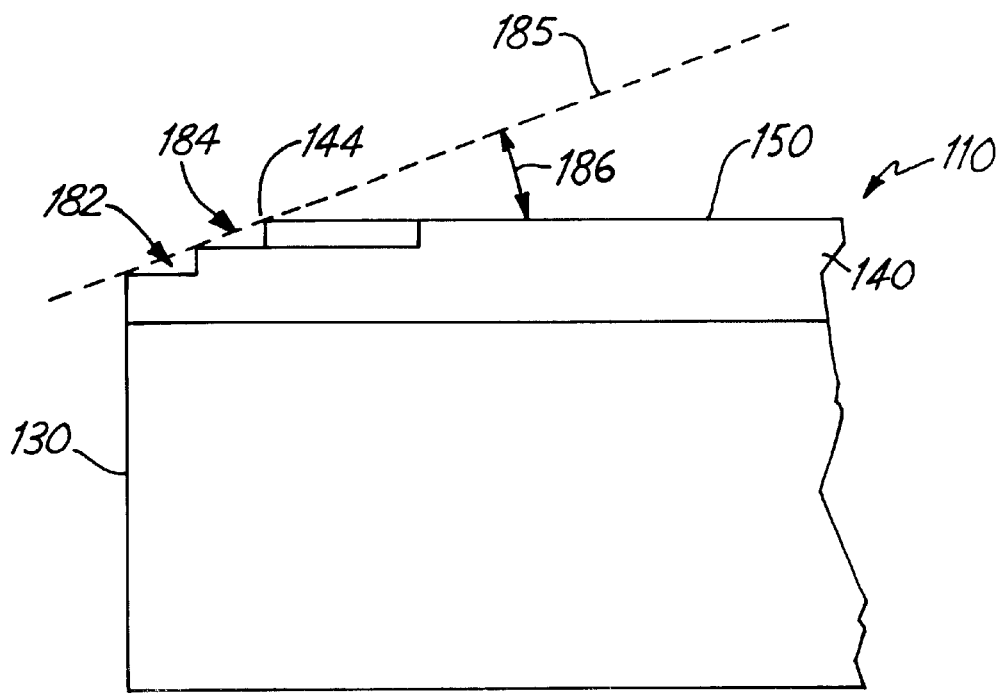
FIG. 3 is a side plan view of the slider shown in FIG. 2, which illustrates a stepped leading "taper" in greater detail.

FIG. 3 is a side plan view of slider 110 which illustrates steps 182 and 184 in greater detail. Dotted line 185 represents a leading taper as it is approximated by the series of steps 182 and 184. The series of steps 182 and 184 have an effective taper angle 186 relative to bearing surfaces 150. The heights and widths of steps 182 and 184 can be selected as desired to approximate a linear taper, a piece-wise linear taper having varying taper angles, or a curved, non-linear taper, for example. The taper angle can be different at different points along slider 110.

The heights of steps 182 and 184 are selected to be sufficiently small to increases pressurization at leading slider edge 130, rather than simply defining the location of where the pressure underneath slider 110 deviates from ambient pressure. In one embodiment, for example, steps 182 and 184 each have a step height between 0.05 microns and 1.5 microns. A plurality of small steps is more effective at increasing pressurization near leading slider edge 130 than a single step since a plurality of steps more closely approximates a traditional taper. In an alternative embodiment, the heights of steps 182 and 184 are different from one another. In a further embodiment, a the slider can include a plurality of shallow steps, formed by step milling, and a deeper step within the shallow steps, formed during milling of cavity 176.

Referring back to FIG. 2, first step 182 is positioned along leading slider edge 130 and includes a first step surface 190 and first risers 192. First step surface 190 extends across substantially the full width 198 of slider 110, from side edge 134 to side edge 136, and extends from leading slider edge 130 to trailing edge 174 of cavity dam 130. Cavity dam 170 is coplanar and contiguous with first step surface 190. First risers 192 extend from slider side edges 134 and 136 toward center line 138, wrap around leading rail edges 144, extend along a portion of inside rail edges 146 and terminate at trailing edge 174 of cavity dam 170. Alternatively, first risers 192 can also extend along a portion of outside rail edges 148 of rails 140 and 142.

Second step 184 includes second step surfaces 194 and second risers 196. Second step surfaces 194 and second risers 196 wrap around leading rail edges 144 and extend along a portion of inside and outside rail edges 146 and 148 of each of the raised rails 140 and 142. Second step surfaces 194 and second risers 196 terminate along inside rail edges 146 at trailing edge 174 of cavity dam 170, thereby forming a pair of discrete second steps. Second step surfaces 194 and second risers 196 also terminate along outside rail edges 148 at a location corresponding to trailing edge 174 of cavity dam 170.

Since second steps 184 follow the contour of leading rail edges 144 and a portion of inside and outside rail edges 146 and 148, air bearing surfaces 150 are more easily pressurized when slider 110 flies at varying skew angles with respect to air flow. These skew angles can become large near the inner and outer disc diameters in small form factor disc drives having rotary actuators.

Figure 4:
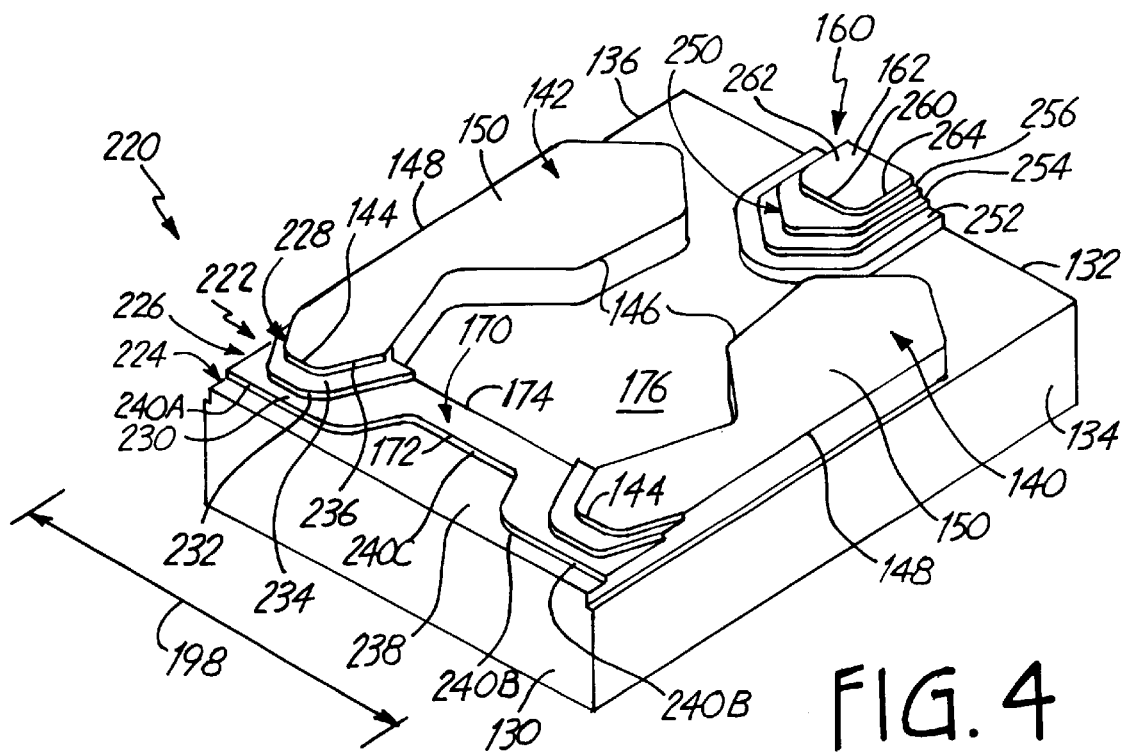
FIG. 4 is a perspective view of a slider having a stepped leading "taper" formed by three steps.

In alternative embodiments, the leading taper can be approximated by more than two steps. For example, FIG. 4 is a perspective view of a slider 220 having a stepped leading "taper" 222 formed by three steps. Stepped leading taper 222 includes steps 224, 226 and 228. Steps 226 and 228 are substantially the same as steps 182 and 184 shown in FIG. 2. Step 226 includes step surface 230 and risers 232. Step surface 230 extends from slider side edge 134 to slider side edge 136 and along trailing edge 174 of cavity dam 170, between rails 140 and 142. Cavity dam 170 is coplanar and contiguous with step surface 230. Risers 232 wrap around leading rail edges 144 and extend along a portion of inside and outside rail edges 146 and 148 of each rail 140 and 142. Step 228 includes step surfaces 234 and risers 236, which also wrap around leading rail edges 144.

Step 224 is positioned between leading slider edge 130 and step 226. Step 224 includes step surface 238 and riser 240 which extend across substantially the full width 198 of slider 220. Riser 240 includes first and second portions 240A and 240B along leading rail edges 144 and a third portion 240C along cavity dam 170. Third portion 240C is offset toward trailing slider edge 132 relative to first and second portions 240A and 240B. The three steps 224, 226 and 228 shown in FIG. 4 can be fabricated with two photolithography processes with careful selection of photolithography masks.

In the embodiment shown in FIG. 4, raised center pad 160 also has a stepped taper 250, which is formed by steps 252, 254 and 256. Bearing surface 162 is coplanar with bearing surfaces 150 and includes leading edge 260 and side edges 262 and 264. Steps 252, 254 and 256 wrap around leading edge 260 and extend along side edges 262 and 264 for improving pressurization of bearing surface 162 at various skew angles.

Figure 5:
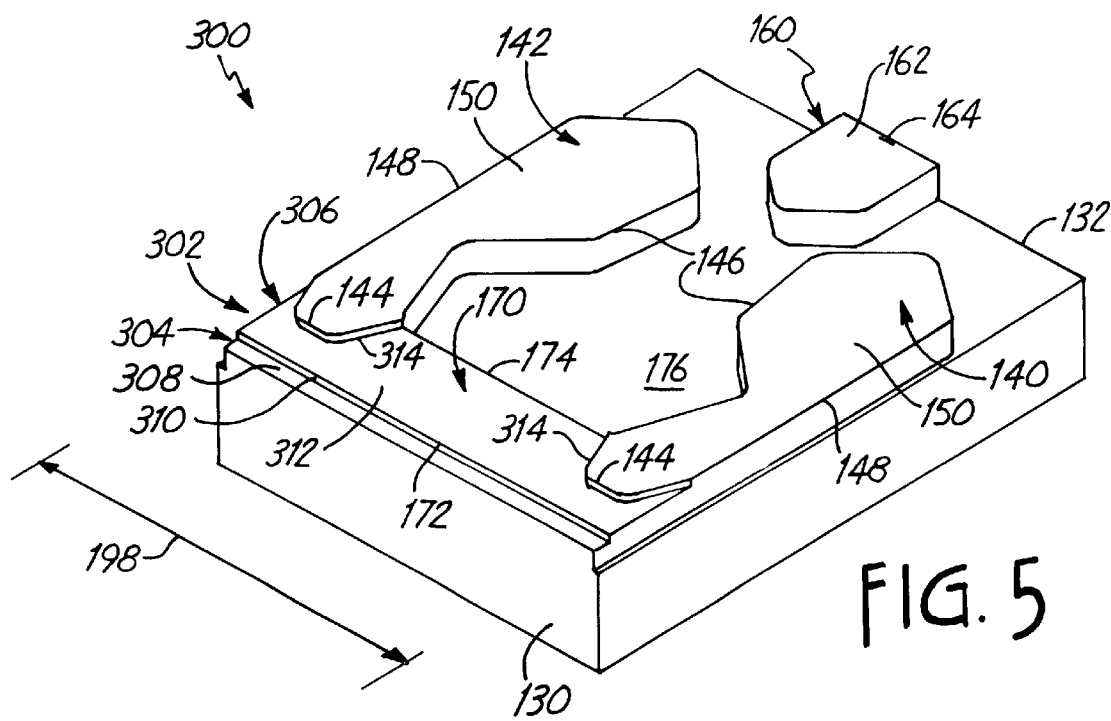
FIG. 5 is a perspective view of a slider having a stepped leading "taper" according to another alternative embodiment of the present invention.

FIG. 5 is a perspective view of a slider 300 according to another alternative embodiment of the present invention. Slider 300 has a stepped leading "taper" 302 between leading slider edge 130 and leading edges 144 of rails 140 and 142. Stepped leading taper 302 is formed by steps 304 and 306. Step 304 includes step surface 308 and riser 310 which extend parallel to and along substantially the full width 198 of slider 130. Step 306 includes step surface 312 and riser 314. Step surface 312 extends across cavity dam 170, from rail 140 to rail 142 and extends from riser 310 to trailing edge 174 of cavity dam 170. Cavity dam 170 is coplanar and contiguous with step surface 312. Step surface 312 and riser 314 terminate along inside edges 146 of rails 140 and 142 at trailing edge 174 of cavity dam 170.

In the embodiment shown in FIG. 5, step 304 follows the outline of slider 300 along leading slider edge 130. This embodiment effectively pressurizes slider 300 along substantially all of leading slider edge 130, not just the areas in front of rails 140 and 142.

Figure 6:
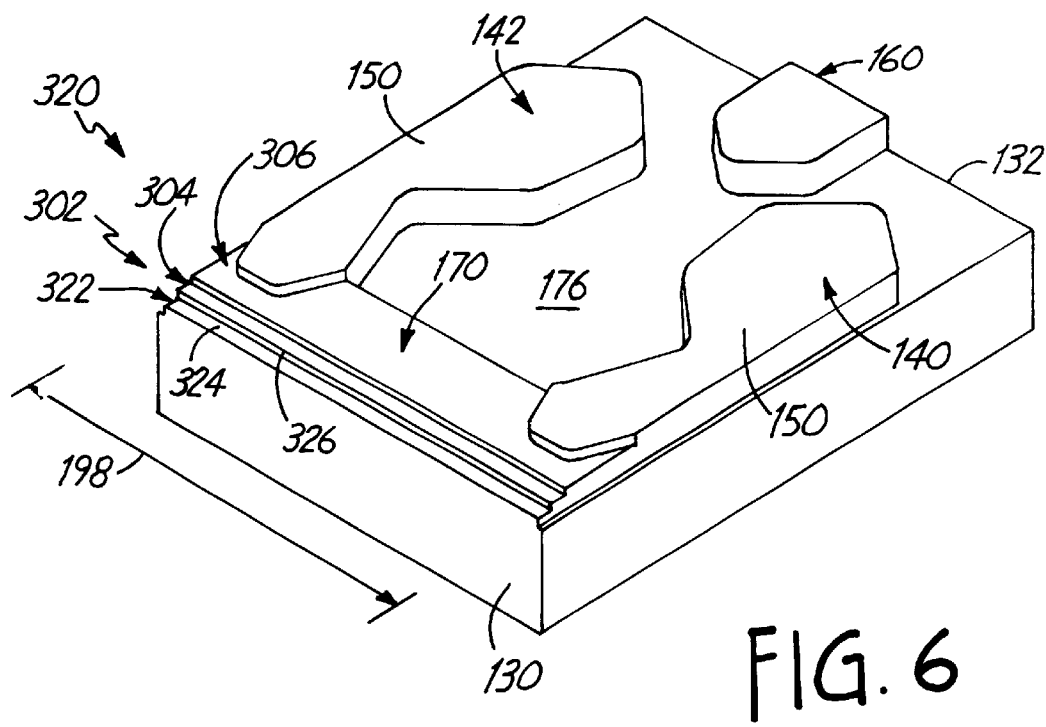
FIG. 6 is a perspective view of a slider having a stepped leading "taper" formed by three steps according to another alternative embodiment of the present invention.

The embodiment shown in FIG. 5 can be modified to include additional steps. For example, FIG. 6 is a perspective view of a slider 320 having a third step 322 positioned between leading edge 130 and step 304. Third step 322 includes step surface 324 and riser 326 which extend parallel to leading slider edge 130 and along substantially the full width 198 of slider 320. Once again, steps 304, 306 and 322 are sufficiently shallow to add pressurization along leading slider edge 130.

Figure 7:
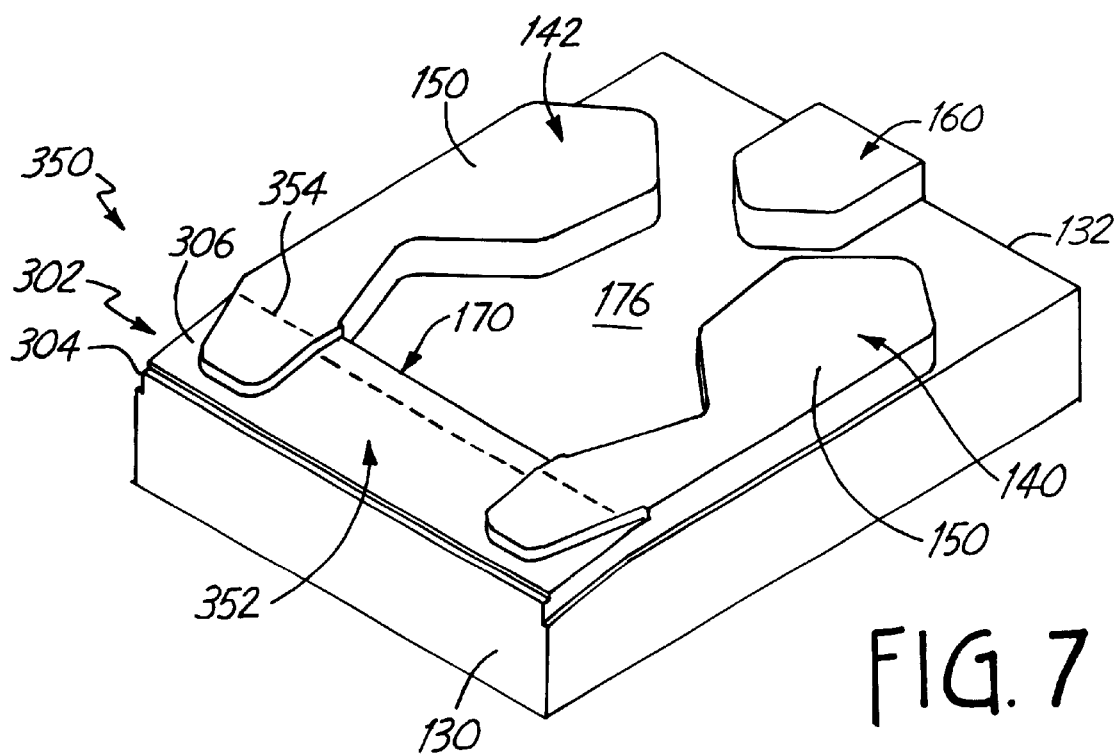
FIG. 7 is a perspective view of a slider having a stepped leading "taper" in combination with a traditional leading taper according to another alternative embodiment of the present invention.

FIG. 7 is a perspective view of a slider 350 according to another alternative embodiment of the present invention. Slider 350 is similar to slider 300 shown in FIG. 5, but further includes a traditional leading taper 352 in combination with the series of steps 304 and 306. Leading taper 352 is formed along leading slider edge 130 during an air bearing surface grinding and lapping process by tilting slider 350 so that leading edge 130 is eroded at the desired taper angle with respect to bearing surfaces 150. Leading taper 352 has an intersection 354 with bearing surfaces 150, which is often referred to as a "taper break". Once leading taper 352 is formed on slider 350, the remainder of the bearing features, such as rails 140 and 142, center pad 160, cross rail 170, subambient pressure cavity 176 and steps 304 and 306, are fabricated through photolithography processes, such as ion milling. Once again, stepped leading "taper" 302 can include any number of multiple steps. The location of the added steps can vary, and the added steps are not required to be parallel to leading slider edge 130.

Figure 8:
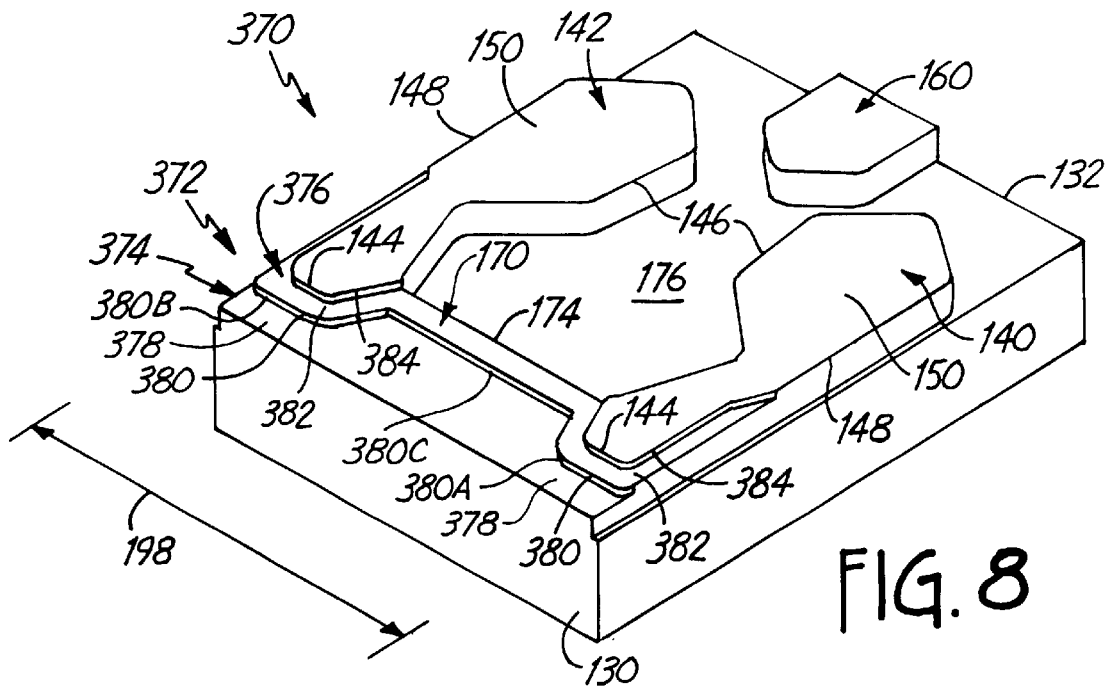
FIG. 8 is a perspective view of a slider having a stepped leading "taper" and a recessed cavity dam according to another alternative embodiment of the present invention.

FIG. 8 is a perspective view of a slider 370 according to another alternative embodiment of the present invention. Slider 370 has a stepped leading "taper" 372 with steps 374 and 376. Step 374 includes a step surface 378 and riser 380. Step 376 includes step surface 382 and riser 384. Step surface 378 and riser 380 extend across substantially the full width 198 of slider 370, along leading slider edge 130. Riser 380 has first and second portions 380A and 380B along leading edges 144 of rails 140 and 142, respectively, and a third portion 380C along cavity dam 170. Third portion 380C is offset toward trailing slider edge 132 relative to first and second portions 380A and 380B.

Step surface 382 extends along trailing edge 174 of cavity dam 170, from rail 140 to rail 142 such that cavity dam 170 is coplanar and contiguous with step surface 382. Step surface 382 and riser 384 wrap around leading edges 144 of rails 140 and 142 and extend along a portion of rail edges 146 and 148. Riser 384 terminates along inside edge 146 at trailing edge 174 of cavity dam 370. Riser 384 extends past trailing edge 174 of cavity dam 170 along outside edge 148 and terminates part-way down the rail. In an alternative embodiment, riser 380 also extends along outside rails edges 148, past trailing edge 174 of cavity dam 170.

In the embodiment shown in FIG. 8, cavity dam 170 is recessed from bearing surfaces 150 by step 376. Recessed cavity dam 170 reduces debris collection near leading slider edge 130.

Figure 9:
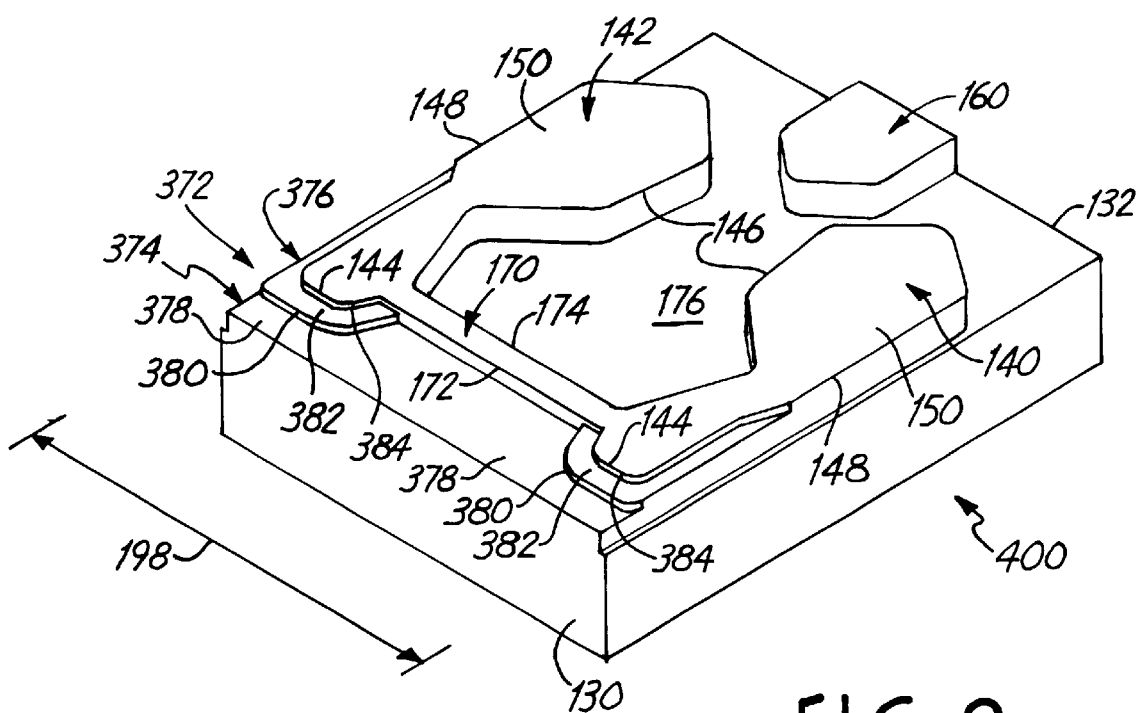
FIG. 9 is a perspective view of a slider having a stepped leading "taper" and a non-recessed cavity dam according to another alternative embodiment of the present invention.

FIG. 9 is a perspective view of a slider 400 which is similar to slider 370 shown in FIG. 8, except that cavity dam 170 is coplanar with bearing surfaces 150 of rails 140 and 142. In FIG. 9, both risers 380 and step surfaces 382 terminate along inside rail edges 146 at leading edge 172 of cavity dam 170. This leaves cavity dam 170 at the same height as bearing surfaces 150.

Figure 10:
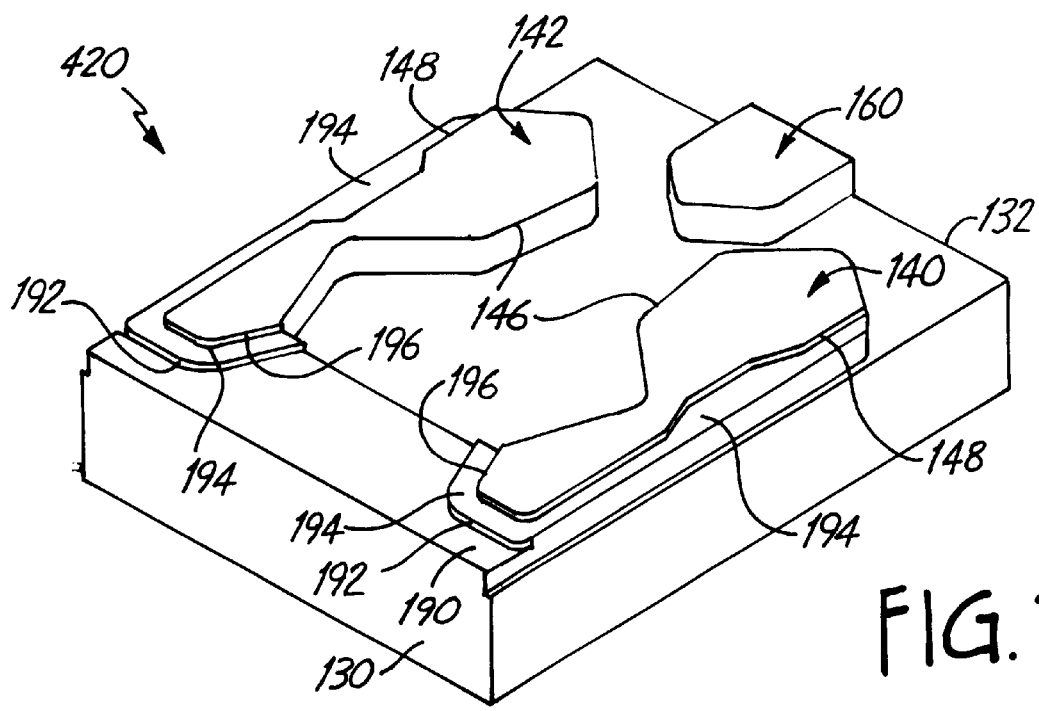
FIG. 10 is a perspective view of a slider having a stepped leading and side "tapers" according to another alternative embodiment of the present invention.

FIG. 10 is a perspective view of a slider 420 according to another alternative embodiment of the present invention. Slider 420 is similar to slider 110 shown in FIG. 2, except that step surfaces 194 and risers 196 extend along substantially an entire length of outside rail edges 148. Step surfaces 194 can have varying width along outside rail edges 148. Alternatively, or in addition, step surfaces 194 and risers 196 can extend along a substantial portion or any portion of inside rail edges 146.

Figure 11:
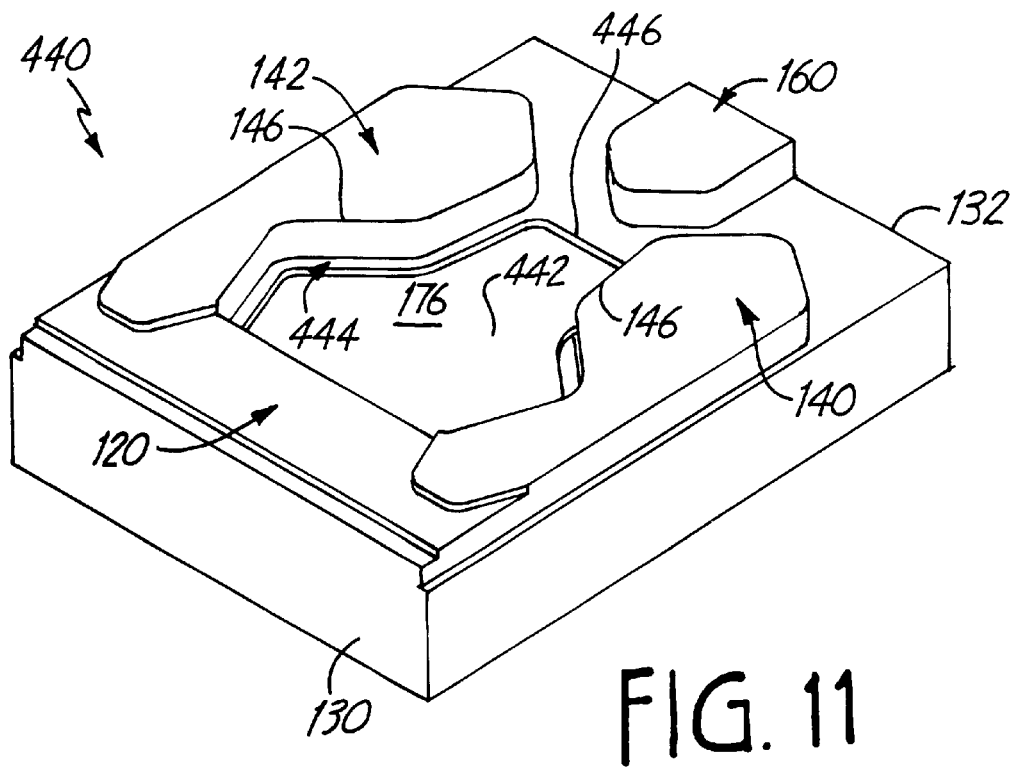
FIG. 11 is a perspective view of a slider having a stepped leading "taper" and a stepped cavity according to another alternative embodiment of the present invention.

FIG. 11 is a perspective view of a slider 440 according to another alternative embodiment of the present invention in which the subambient pressure cavity has an additional cavity step. Slider 440 is similar to slider 300 shown in FIG. 5, with the exception of the additional cavity step. Subambient pressure cavity 176 has a cavity floor 442 and a perimeter defined by cavity dam 170 and inside edges 146 of rails 140 and 142. Cavity step 444 extends around the perimeter of cavity 176 and has a cavity step height of 0.05 to 1.5 microns. Cavity step 444 can have an advantage of generating larger subambient pressure just downstream of cavity dam 170. Further, the pressure can be increased again further downstream (at trailing edge 446 of cavity step 444) to increase pressure on raised center pad 160. The cavity step 444 also assists in pressurizing the downstream rail (rail 140 or 142) at high skew angles. The cavity step 444 shown in FIG. 11 can be extended to multiple steps providing multiple levels in cavity 176.

Figure 12:
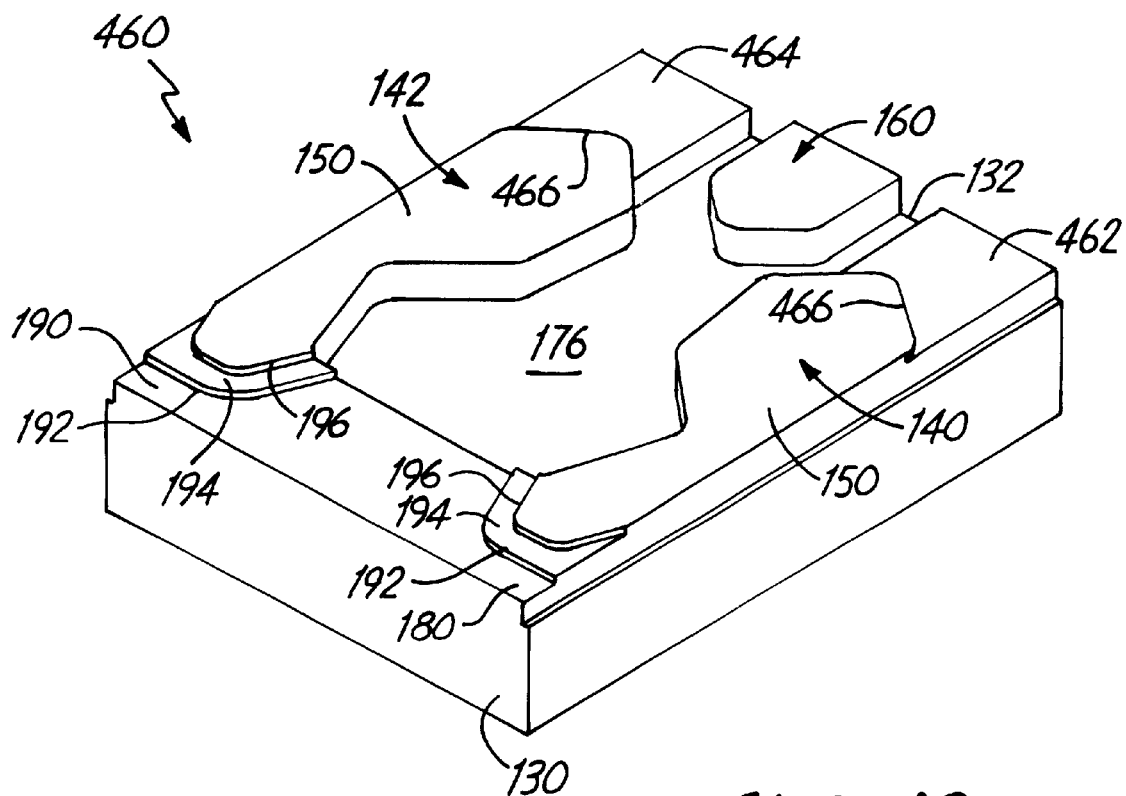
FIG. 12 is a perspective view of a slider having a stepped leading "taper" and rails with recessed trailing end surfaces according to another alternative embodiment of the present invention.

FIG. 12 is a perspective view of a slider 460 according to yet another alternative embodiment of the present invention. Slider 460 is similar to slider 110 shown in FIG. 2, except rails 140 and 142 further include trailing rail surfaces 462 and 464, respectively, which extend from trailing edges 466 of bearing surfaces 150 to trailing slider edge 132. Trailing rail surfaces 462 are raised from the slider body and recessed from bearing surfaces 150. In one embodiment, trailing rail surfaces 462 and 464 are coplanar with step surface 194. Trailing rail surfaces 462 and 464 are formed partially with the cavity etch used to form subambient pressure cavity 176 and partially with a step etch used to form step surface 194. Trailing rail surfaces 462 and 464 are positioned downstream of bearing surfaces 150 for pressurizing rails 140 and 142 at very large-pitch and roll angles, such as might be seen in ramp load-unload applications.

Although the present invention has been described with reference to preferred embodiments, workers skilled in the art will recognize that changes may be made in form and detail without departing from the spirit and scope of the invention. For example, a multiple-step leading "taper" can be implemented in sliders having other rail and cavity geometries, and any number of steps can be used to approximate the taper. Multiple steps can also be applied along the sides of the rails. In addition, the present invention can be applied to sliders having the transducer mounted to a center rail or pad, a side rail, or any other location or feature on the slider body. Any transducer can be used, such as a magnetic, a magnetoresistive, or an optical transducer, for example.

What is claimed is:

1. A self-loading disc head slider comprising:

a slider body having a leading slider edge and a trailing slider edge;

first and second raised rails, wherein each raised rail has a leading rail edge, inside and outside rail edges and a bearing surface;

a cavity dam extending between the first and second raised rails;

a subambient pressure cavity trailing the cavity dam, between the first and second raised rails; and a stepped leading taper extending from the leading slider edge to the bearing surfaces of the first and second raised rails, wherein the stepped leading taper is formed of first and second steps, wherein the first step is positioned along the leading slider edge, and the second step wraps around the leading rail edges of the first and second raised rails and extends along a portion of the inside and outside rail edges of the first and second raised rails, and wherein the first and second steps have a step height of 0.05 to 1.5 microns.

2. The self-loading disc head slider of claim 1 wherein:

the slider body has a width along the leading slider edge; and the first step has a first step surface and a first riser which extend parallel to and along substantially the full width.

3. The self-loading disc head slider of claim 2 wherein:

the cavity dam has a trailing edge adjacent the subambient pressure cavity; and the second step comprises a second step surface and a second riser, wherein the second step surface extends across the cavity dam, from the first raised rail to the second raised rail and from the first step riser to the trailing edge of the cavity dam, such that the cavity dam is coplanar with the second step surface, and wherein the second step surface and the second riser terminate along the inside edges of the first and second rails at the trailing edge of the cavity dam.

4. The self-loading head slider of claim 3 wherein:

the first and second step surfaces acre tapered along the leading slider edge with respect to the bearing surfaces of the first and second raised rails.

5. The self-loading disc head slider of claim 2 and further comprising:

a third step positioned between the first step and the leading slider edge, wherein the third step extends parallel to and along substantially the full width of the leading slider edge.

6. The self-loading head slider of claim 1 wherein:

the slider body has a width along the leading slider edge;

the cavity dam has a trailing edge adjacent the subambient pressure cavity;

the first step comprises a first step surface and a first riser, wherein the first step surface extends across the cavity dam, from the first raised rail to the second raised rail and from the leading slider edge to the trailing edge of the cavity dam, such that the cavity dam is coplanar with the first step surface; and the second step comprises a second step surface and a second riser, wherein the second step surface and the first and second risers wrap around the leading rail edges of the first and second raised rails, extend along a portion of the inside edges of the first and second raised rails and terminate at the trailing edge of the cavity dam, thereby forming a pair of discrete second step portions along the leading edges of the first and second raised rails, respectively.

7. The self-loading head slider of claim 1 and further comprising a third step positioned between the leading slider edge and the first step, wherein:

the slider body has a width along the leading slider edge;

the cavity dam has a trailing edge adjacent the subambient pressure cavity;

the first step comprises a first step surface and a first riser, wherein the first step surface extends along the trailing edge of the cavity dam, from the first raised rail to the second raised rail such that the cavity dam is coplanar with the first step surface;

the second step comprises a second step surface and a second riser, wherein the second step surface and the first and second risers wrap around the leading rail edges of the first and second raised rails, extend along a portion of the inside edges of the first and second raised rails and terminate at the trailing edge of the cavity dam, thereby forming a pair of discrete second step portions along the leading edges of the first and second raised rails, respectively; and the third step comprises a third step surface and a third riser, wherein the third step surface and the third riser extends across substantially the full width of the slider body.

8. The self-loading head slider of claim 7 wherein the third riser has first and second portions along the leading edges of the first and second raised rails, respectively, and a third portion along the cavity dam, wherein the third portion is offset toward the trailing slider edge relative to the first and second portions.

9. The self-loading head slider of claim 1 wherein:

the slider body has a width along the leading slider edge;

the cavity dam has a trailing edge adjacent the subambient pressure cavity;

the first step comprises a first step surface and a first riser which extend across substantially the full width of the slider body, wherein the first riser has first and second portions along the leading edges of the first and second raised rails, respectively, and a third portion along the cavity dam, wherein the third portion is offset toward the trailing slider edge relative to the first and second portions; and the second step comprises a second step surface and a second riser, wherein the second step surface extends along the trailing edge of the cavity dam, from the first raised rail to the second raised rail such that the cavity dam is coplanar with the second step surface, and wherein the second riser terminates along the inside edges of the first and second rails at the trailing edge of the cavity dam.

10. The self-loading head slider of claim 9 wherein the second step surface and the second riser extend toward the trailing slider edge along the outside edges of the first and second raised rails, past the trailing edge of the cavity dam.

11. The self-loading head slider of claim 1 wherein:

the slider body has a width along the leading slider edge;

the cavity dam is coplanar with the bearing surfaces and has a leading edge and a trailing edge;

the first step comprises a first step surface and a first riser, wherein the first step surface extends across substantially the full width of the slider body and from the leading slider edge to the leading edge of the cavity dam; and the second step comprises a second step surface and a second riser, wherein the second step surface and the first riser wrap around the leading rail edges of the first and second raised rails, extend along a portion of the inside rail edges and terminate at the leading edge of the cavity dam.

12. The self-loading head slider of claim 11 wherein the second step surface and the second riser extend toward the trailing slider edge along the outside edges of the first and second raised rails, past the trailing edge of the cavity dam.

13. The self-loading head slider of claim 1 wherein the second step extends along substantially an entire length of the outside rail edges.

14. The self-loading head slider of claim 1 wherein the subambient pressure cavity has a cavity floor, a perimeter defined by the cavity dam and the first and second raised rails, and a cavity step which extends around the perimeter, wherein the cavity step has a cavity step height of 0.05 to 1.5 microns, as measured from the cavity floor.

15. The self-loading head slider of claim 1 wherein the first and second raised rails terminate prior to the trailing slider edge and wherein the slider further comprises:

a raised center pad positioned along the trailing slider edge, between the first and second raised rails, wherein the raised center pad comprises a leading edge, first and second side edges, a bearing surface, which is coplanar with the bearing surfaces of the first and second raised rails, and a further stepped leading taper, which is formed of multiple stepped surfaces extending along the leading edge of the raised center pad.

16. The self-loading head slider of claim 15 wherein the multiple stepped surfaces wrap around the leading edge of the raised center pad so as to extend along the first and second side edges of the raised center pad.

17. The self-loading head slider of claim 1 and further comprising a raised center pad positioned along the trailing slider edge, between the first and second raised rails, and wherein:

the first step comprises a first step surface and a first riser;

the second step comprises a second step surface and a second riser, wherein the second step surface is raised from the first step surface by 0.05 microns to 1.5 microns and is recessed from the bearing surfaces by 0.05 microns to 1.5 microns; and the first and second raised rails each comprise a trailing rail surface which trails the bearing surfaces with respect to the leading and trailing slider edges and is coplanar with the second step surface.

18. A self-loading disc head slider comprising:

a slider body having a leading slider edge and a trailing slider edge;

first and second raised rails, wherein each raised rail has a leading rail edge, inside and outside rail edges and a bearing surface;

a cavity dam extending between the first and second raised rails;

a subambient pressure cavity trailing the cavity dam, between the first and second raised rails; and a stepped leading taper extending from the leading slider edge to the bearing surfaces of the first and second raised rails, wherein the stepped leading taper is formed of first and second steps, wherein the first step is positioned along the leading slider edge, and the second step wraps around the leading rail edges of the first and second raised rails and extends along a portion of the inside and outside rail edges of the first and second raised rails.

19. A self-loading disc head slider comprising:

a slider body having a leading slider edge and a trailing slider edge;

first and second raised rails, wherein each raised rail has a leading rail edge, inside and outside rail edges and a bearing surface and terminates prior to the trailing slider edge;

a cavity dam extending between the first and second raised rails;

a subambient pressure cavity trailing the cavity dam, between the first and second raised rails;

a stepped leading taper extending from the leading slider edge to the bearing surfaces of the first and second raised rails, wherein the stepped leading taper is formed of first and second steps, wherein the first step is positioned along the leading slider edge, and the second step wraps around the leading rail edges of the first and second raised rails and extends along a portion of the inside and outside rail edges of the first and second raised rails; and a raised center pad positioned along the trailing slider edge, between the first and second raised rails, wherein the raised center pad comprises a leading edge, first and second side edges, a bearing surface, which is coplanar with the bearing surfaces of the first and second raised rails, and a further stepped leading taper, which is formed of multiple stepped surfaces extending along the leading edge of the raised center pad.

* * * * *

UNITED STATES PATENT AND TRADEMARK OFFICE
CERTIFICATE OF CORRECTION

PATENT NO.         : 6,483,667 B1
APPLICATION NO. : 09/354419
DATED              : November 19, 2002
INVENTOR(S)        : Lowell J. Berg et al.

It is certified that error appears in the above-identified patent and that said Letters Patent is hereby corrected as shown below:

Col. 8, line 59, change "acre" to --are--.

Signed and Sealed this

Sixth Day of October, 2009

David J. Kappos
*Director of the United States Patent and Trademark Office*